United States Patent
Schreiber et al.

(10) Patent No.: US 12,363,197 B1
(45) Date of Patent: Jul. 15, 2025

(54) MANAGING NETWORK SERVICES UTILIZING SERVICE GROUPS

(71) Applicant: Amazon Technologies, Inc., Seattle, WA (US)

(72) Inventors: Yevgeny Schreiber, Baulkham Hills (AU); Arvind Namasivayam, Sydney (AU); Kin-Hon Chan, Sydney (AU); Donavan Miller, Darlington (AU); Oren Nachman, St Ives (AU)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/305,137

(22) Filed: Jun. 30, 2021

(51) Int. Cl.
*H04L 67/51* (2022.01)
*H04L 12/28* (2006.01)
*H04L 67/01* (2022.01)
*H04L 67/1095* (2022.01)
*H04L 67/306* (2022.01)

(52) U.S. Cl.
CPC .......... *H04L 67/51* (2022.05); *H04L 12/2876* (2013.01); *H04L 67/01* (2022.05); *H04L 67/1095* (2013.01); *H04L 67/306* (2013.01)

(58) Field of Classification Search
CPC ..... H04L 67/51; H04L 12/2876; H04L 67/01; H04L 67/1095; H04L 67/306
See application file for complete search history.

(56) References Cited

U.S. PATENT DOCUMENTS

| | | | | |
|---|---|---|---|---|
| 2002/0036658 | A1* | 3/2002 | Carolan | H04L 61/10 715/764 |
| 2002/0140726 | A1* | 10/2002 | Schwartz | H04L 67/04 715/738 |
| 2003/0041130 | A1* | 2/2003 | Harrisville-Wolff | H04L 9/40 709/224 |
| 2005/0021670 | A1* | 1/2005 | Maes | H04L 67/51 709/227 |
| 2008/0091807 | A1* | 4/2008 | Strub | H04L 41/5064 709/223 |
| 2011/0078303 | A1* | 3/2011 | Li | H04L 67/1031 718/1 |
| 2014/0188801 | A1* | 7/2014 | Ramakrishnan | G06F 16/27 707/634 |
| 2015/0142930 | A1* | 5/2015 | Prathaban | H04L 67/306 709/219 |
| 2016/0373794 | A1* | 12/2016 | Heitlinger | H04N 21/2541 |
| 2017/0111444 | A1* | 4/2017 | Saheba | H04L 67/1012 |

* cited by examiner

*Primary Examiner* — Nicholas R Taylor
*Assistant Examiner* — Tania M Pena-Santana
(74) *Attorney, Agent, or Firm* — Knobbe, Martens, Olson & Bear, LLP (57) ABSTRACT

A network service incorporating service groups to increase fault tolerance and data isolation for integrated network services and client data is provided. The network service provider can process network requests utilizing individual service groups that correspond to a set of integrated services and client data (e.g., cells). The service groups can be associated according to customer identifier. Computing resources within a service group are isolated from computing resources utilized in other service groups and resources that host/provide the service or the integrated data can be independently scaled by the service provider.

21 Claims, 7 Drawing Sheets

MANAGING NETWORK SERVICES UTILIZING SERVICE GROUPS

BACKGROUND

Network-based computing, in general, is an approach to providing access to information technology resources through services, such as Web services, where the hardware or software used to support those services is dynamically scalable to meet the needs of the services at any given time. In network-based computing, elasticity refers to network-delivered computing resources that can be scaled up and down by a network service provider to adapt to changing requirements of users. For example, the elasticity of these resources can be in terms of processing power, storage, bandwidth, and so forth. Elastic computing resources may be delivered automatically and on-demand, dynamically adapting to the changes in resource requirements on or within a given user's system. For example, a client can use a network service to host a large online streaming service, set up with elastic resources so that the number of webservers streaming content to users scale up to meet bandwidth requirements during peak viewing hours, and then scale back down when system usage is lighter.

A client typically will rent, lease, or otherwise pay for access to the elastic resources accessed through network service, and thus does not have to purchase and maintain the hardware and/or software that provide access to these resources. This provides a number of benefits, including allowing users to quickly reconfigure their available computing resources in response to changing demands of their enterprise and enabling the network service provider to automatically scale provided computing service resources based on usage, traffic, or other operational requirements. This dynamic nature of network service computing services, in contrast to a relatively static infrastructure of on-premises computing environments, requires a system architecture that can reliably re-allocate its hardware according to the changing needs of its client base and demands on the network-based computing services.

In network-based computing, locations in which applications may be hosted according to physical criteria, such as regions. Each region comprises a separate geographic area from other regions that may be isolated from all other regions in the network-based computing system. An availability zone is an isolated location inside a region.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Generally described, aspects of the present disclosure relate to the management of network-based services in a network-based computing system. In the network-based computing system, customers can access various services that are hosted across various isolated computing systems provided by the network-based service provider (referred to as regions). Individual services may be hosted on physical or virtual computing resources and accessed by customers/clients over a communication network. As will be described in greater detail below, to mitigate the potential impact from inter-customer requests, aspects of the present application correspond to the utilization of service groups, which generally correspond to a plurality of integrated, instantiated network services and client data. Individual integrated, instantiated network services can be referred to as an individual cell. Accordingly, illustratively individual service groups correspond to a collection of cells. The service groups are instantiated in a manner that are isolated from other service groups and may be managed independently.

Existing mechanisms for hosting services can include network based computing instances corresponding to physical or virtual computing devices that can receive network requests from a number of different customers/client devices. In some instances, the network service provider may provide physical computing devices that host a plurality of virtual machine instances, each of which may be configured to host different applications for different customers. In other instances, a network service provider may provide physical computing devices that a plurality of virtual machine instances that host a common application for different customers, including different configurations of a common application/service.

One potential deficiency associated with such existing service mechanisms, generally referred to as a "noisy neighbor" problem, can arise in situations when independent customer requests to a network service can impact the overall performance of a physical or virtual machine instance. For example, assume a first customer request for a network service, such as a data processing application, requires a significant amount of computing resources (e.g., memory, processing resources, network bandwidth, etc.) to complete. If a second, independent customer request is received concurrently with the processing of the first customer request, the processing of a second, independent customer request for the network service can be impacted based on the first customer's required resource consumption. Other types of service problems associated with hosting network services for multiple clients can further add deficiencies.

Another deficiency associated with existing service mechanisms relates to the ability for the service provider to scale resources utilized to provide services. In this aspect, the service provider is typically limited to scaling physical and virtual computing resources for groups of customers utilizing the service (e.g., application) even if all the individual customers do not require additional resources. This can result in additional costs to the customers or excess provisioning of resources by the service provider.

The network-based services of the present disclosure improve upon the faults of the existing mechanisms in various ways by the utilization of service groups. Illustratively, individual service groups correspond to a hosting of a plurality of instantiated services and data (e.g., individually referred to as a cell). Illustratively, each service group is associated with a single, unique identifier, such as a unique customer identifier. As a grouping of integrated, instantiated services and data, services groups represent a collection fully executable services by an individual client without need to share computing device resources utilized to provide services, data stores utilized in the delivery of the services, or a combination thereof. Each instance of a service group is illustrated isolated from other service group instances and can be independently managed by the service provider. Accordingly, client requests consuming excess resources (e.g., noisy neighbor) can be mitigated because different customers do not share computing device resources because of the isolation. Additionally, the service provider can individually scale computing resources utilized to provide the plurality of services in the service groups, such as for purposes of load balancing, throughput, etc., in a manner unique to the requirements or configuration of the individual service group. Other benefits or improvements may also be realized.

These and other aspects of the disclosure will now be described with regard to certain examples and embodiments, which are intended to illustrate but not limit the disclosure. Although the examples and embodiments described herein will focus on, for the purpose of illustration, specific calculations and algorithms, one of skill in the art will appreciate the examples are illustrative only, and are not intended to be limiting.

Figure 1:
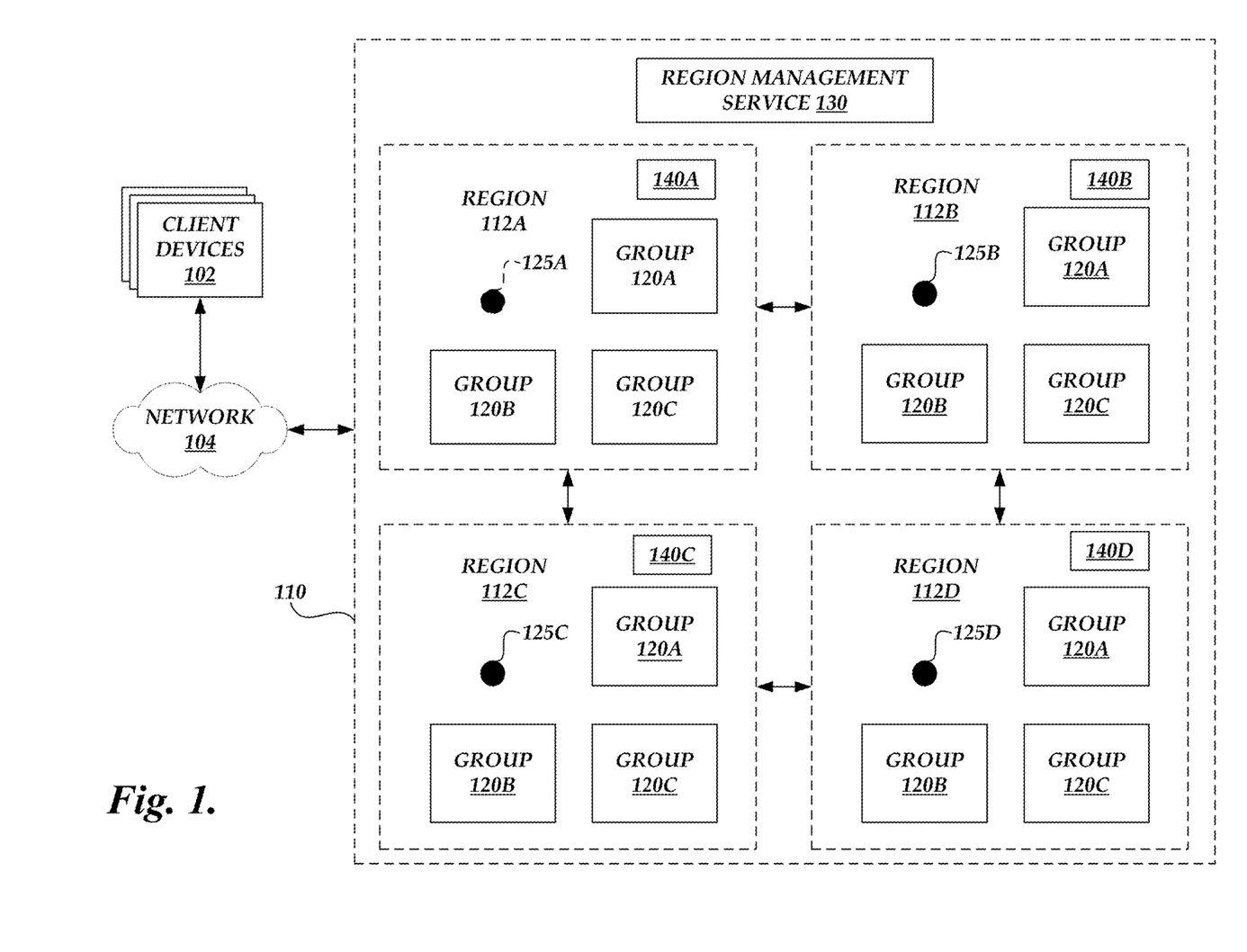
FIG. 1 depicts a schematic diagram of a network service provider in which various embodiments according to the present disclosure can be implemented.

FIG. 1 depicts an example computing environment 100 in which a network service provider 110 provides network-based services to client devices 102 via a network 104. As used herein, a network service provider 110 implements network-based services 110 (sometimes referred to simply as a "network-based services 110" or a "services 110") and refers to a large, shared pool of network-accessible computing resources (such as compute, storage, or networking resources, applications, or services), which may be virtualized or bare-metal. The network service provider 110 can provide convenient, on-demand network access to the shared pool of configurable computing resources that can be programmatically provisioned and released in response to customer commands. These resources can be dynamically provisioned and reconfigured to adjust to variable load. The concept of "cloud computing" or "network-based computing" can thus be considered as both the applications delivered as services over the network 104 and the hardware and software in the network service provider 110 that provide those services.

As shown in FIG. 1, the network service provider 110 is illustratively divided into a number of regions 112A-D. Each region 112 may be geographically isolated from other regions 112. For example, region 112A may be geographically located on the U.S. east coast, region 112B may be geographically located on the U.S. west coast, region 112C may be geographically located in Europe, region 112D may be geographically located in Asia, etc. While four regions 112 are shown in FIG. 1, a network service provider 110 may include any number of regions. Each region 112 is illustratively in communication via a network, which may be a private network of the system 110 (e.g., privately owned circuits, leased lines, etc.) or a public network (e.g., the Internet).

In FIG. 1, each region 112 is further shown as divided into a number of service groups 120 (across all regions 112, groups 120A-C), which may also be referred to as cell groups or cells of cells. Each service group 120 represents a fully deployable instance of one or more network services integrated with appropriate client-specific data that can be accessed by a client via the communication network 104. The individual services that form individual service groups illustratively represents computing systems that are isolated from the computing systems of other service groups 120 in a manner that reduces or mitigates the potential impact on the execution of services between service groups 120. For example, the computing resources of each service group 120 may be physically isolated by distance of physical barriers and may associated with independent electric power and network resources to be electrically isolated from resources of other processing groups 120. In other illustrative embodiments, individual service groups 120 may be further associated with independent cooling systems, independent intra-zone networking resources, etc. However, the service groups 120 may still be considered, in some embodiments, as isolated even with some sharing of resources, e.g., a common power supply or common cooling systems. Illustratively, the computing resources provided in groups 120A-120C can be fully replicated for a set of regions and accessible by client requests regardless of region. The integrated data may automatically be duplicated across regions such all the service groups in the different regions are available to service client requests. In some embodiments, service groups 120 associated to a single client identifier can be configured such that different regions individually host computing resources that provided an integrated service and data accessible. In this embodiment, the integrated service and data may not be commonly duplicated in each region, but would be accessible by accessing specific computing device resources in respective regions.

Each service group 120 within each region 112 is illustratively connected to the network 104. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. While the system 110 is shown in FIG. 1 as having a single connection to the network 104, multiple connections may exist in various implementations. For example, each service group 120 may have one or more connections to the network 104 distinct from other service group 120 (e.g., one or more links to an Internet exchange point interconnecting different autonomous systems on the Internet).

Each region 112A-112D includes an endpoint 125A-125D, respectively. The endpoints 125A-125D may comprise computing devices or systems through which the customer's application can access the network-based groups 120 (e.g., the computing devices hosting the integrated services and data). Information provided to one of the endpoints 125 may be propagated to all other endpoints 125. Each region 112 may include more than one endpoint 125 or each region 112 may not include even one endpoint 125. With continued reference to FIG. 1, the network service provider 110 further includes a region information processing service 130. As will be described in greater detail below, the region information processing service 130 can be configured to facilitate replication of service group assignment across regions. As will be explained, individual regions 112 may include a service group management component 140A-140C that can facilitate the association of service groups to client requests and may replicate assigned or associations of service groups 120 to client identifiers such that service requests may be process in a consistent manner regardless of regional boundaries. Although service group management components 140A-140C have been illustrated as being separate from the endpoints 125A-125C, one skilled in the relevant art will appreciate that the functionality of the service group management components 104A-140C may be incorporated as part of the functionality implemented by the endpoints 125. Additionally, as will be explained in greater detail below, in some embodiments, after an initial request processing, subsequent client requests may be transmitted directly to an associated client group 120, bypassing at least some of the routing functionality implemented by a region.

Client computing devices 102 can include any network-equipped computing device, for example desktop computers, laptops, smartphones, tablets, e-readers, gaming consoles, and the like. Users can access the network service 110 via the network 104 to view or manage their data and computing resources, as well as to use websites and/or applications hosted by the network service 110. In accordance with embodiments of the present disclosure, individual clients will be associated with associated with a unique service group that will function to respond to all service requests attributed to the individual client. For example, service requests can be parsed to identify unique client identifiers, which can then be matched or correlated to unique service group identifiers. The network service 110 can then independently manage the resources utilized to host the services in each respective service group based on the requirements of the service groups, current loads attributable to all client requests, or a combination thereof. For example, the network service 110 can scale individual resources within a service group 120 without having to scale similar resources in other service groups 102. Additionally, the scaling of resources can be related to a subset of the resources corresponding to the individual service group 120 so that all resources within a service group have to be scale equally.

Figure 2:
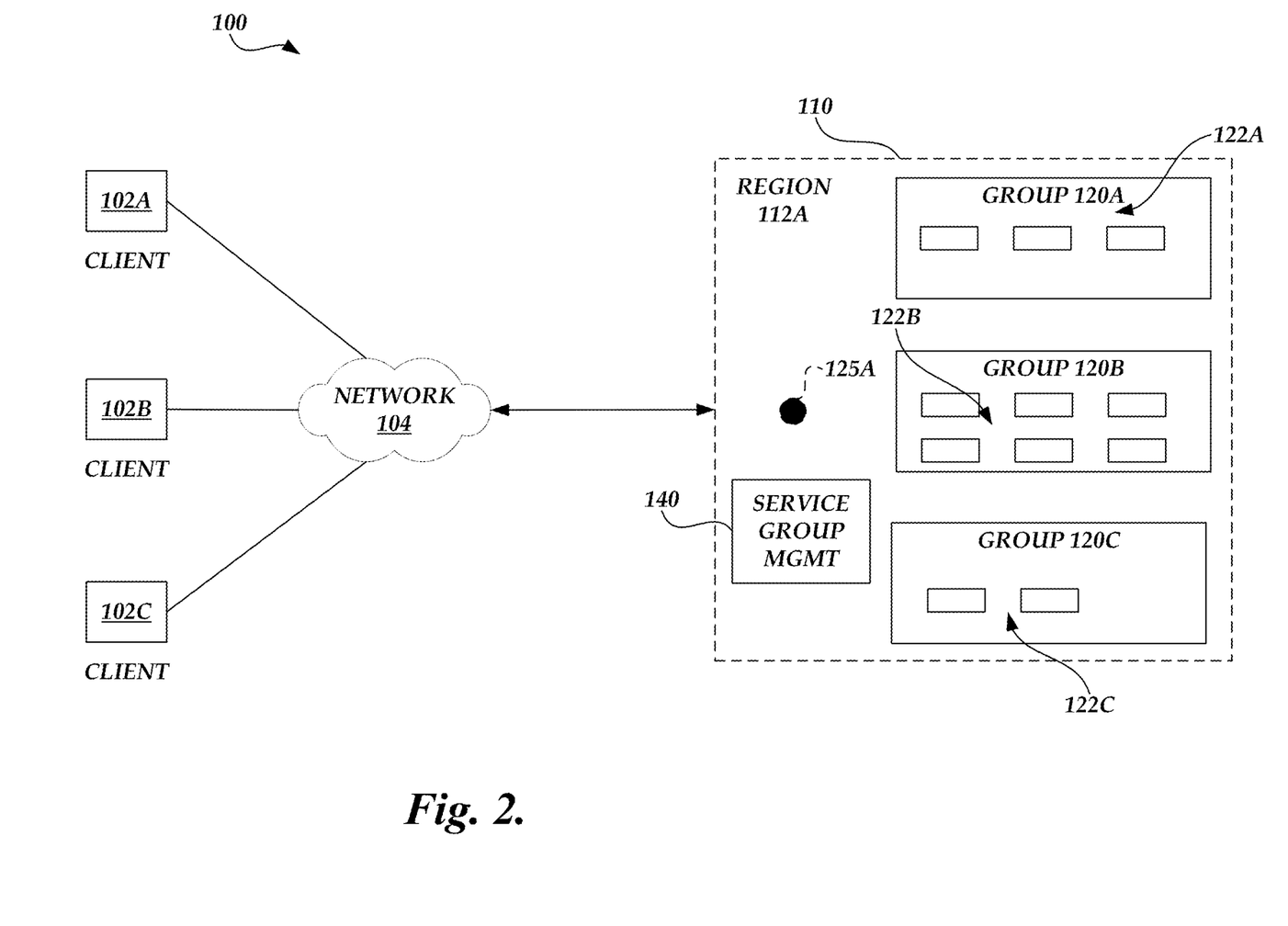
FIG. 2 depicts the schematic diagram of FIG. 1 illustrating a plurality of service groups within a defined region.

FIG. 2 depicts the network environment 100 of FIG. 1 illustrating a plurality of service groups 120A-120C within a defined region 112A. For purposes of illustration, FIG. 2 illustrates three distinct client devices 102A-102C that correspond to different client identifiers. The different client devices 102A-102C may be physically remote from each other and may correspond to different customers entirely. In other embodiments, the different client devices 102A-102 may have some overlap, such as associated with a common organization or physically proximate, but are associated with distinct and different customer identifiers or client identifiers.

For purposes of illustration and with continued reference to FIG. 2, it is assumed that all the client devices 102A, 102B, 102C have previously been associated with service groups 120A, 120B, and 120C, respectively. As will be described below, the association of a client identifier with a service group may be facilitated through an initial request processing. Accordingly, while service groups 120A, 120B, and 120C may be originally configured to provide a common set of services to the client devices 102, the amount of resources or configuration of resources instantiated by the network service provider 110 to host the services may vary. Additionally, because individual service groups 120 correspond to integrated service and client data, each instance of a service group would be unique to the associated client identifier (or other selective identifier). As illustrated in FIG. 2, service group 120A is associated with a first subset of resources 122A, service group 122B is associated with a second subset of resources 122B, and service group 122C is associated with a third subset of resources 122C. Illustratively, the first subset of resources 122A, second subset of resources 122B, and third subset of resources 122C are independently managed and can be associated with a different scale. For purposes of the illustration, the resources 122 generally represent computing device resources configured to provide the integrated services, client specific data, or a combination thereof. the service management component 140 can monitor the performance of the service groups 120A-120C and the requirements of the requested services and independent scale the resources 122A-122C relative to the service groups in the region 112A. Additionally, the service management component 140 can further independently scale individual resources in a package of resources 122A-122C based on the computing resources utilizing in hosting/providing services, hosting/providing client specific data, or a combination therefore. For example, the for a group 120, the service management component 140 may increase resources for hosting a data application while maintaining resources for storing client specific data. The scaling decision does not need to be replicated across each region 112, as the determinative factor may be unique to a particular region. As described previously, service groups 122A, 122B and 122C can be considered isolated in a manner that resource consumption within an individual service group 120 does not impact (or minimally impacts) other processing groups 120.

Figure 3:
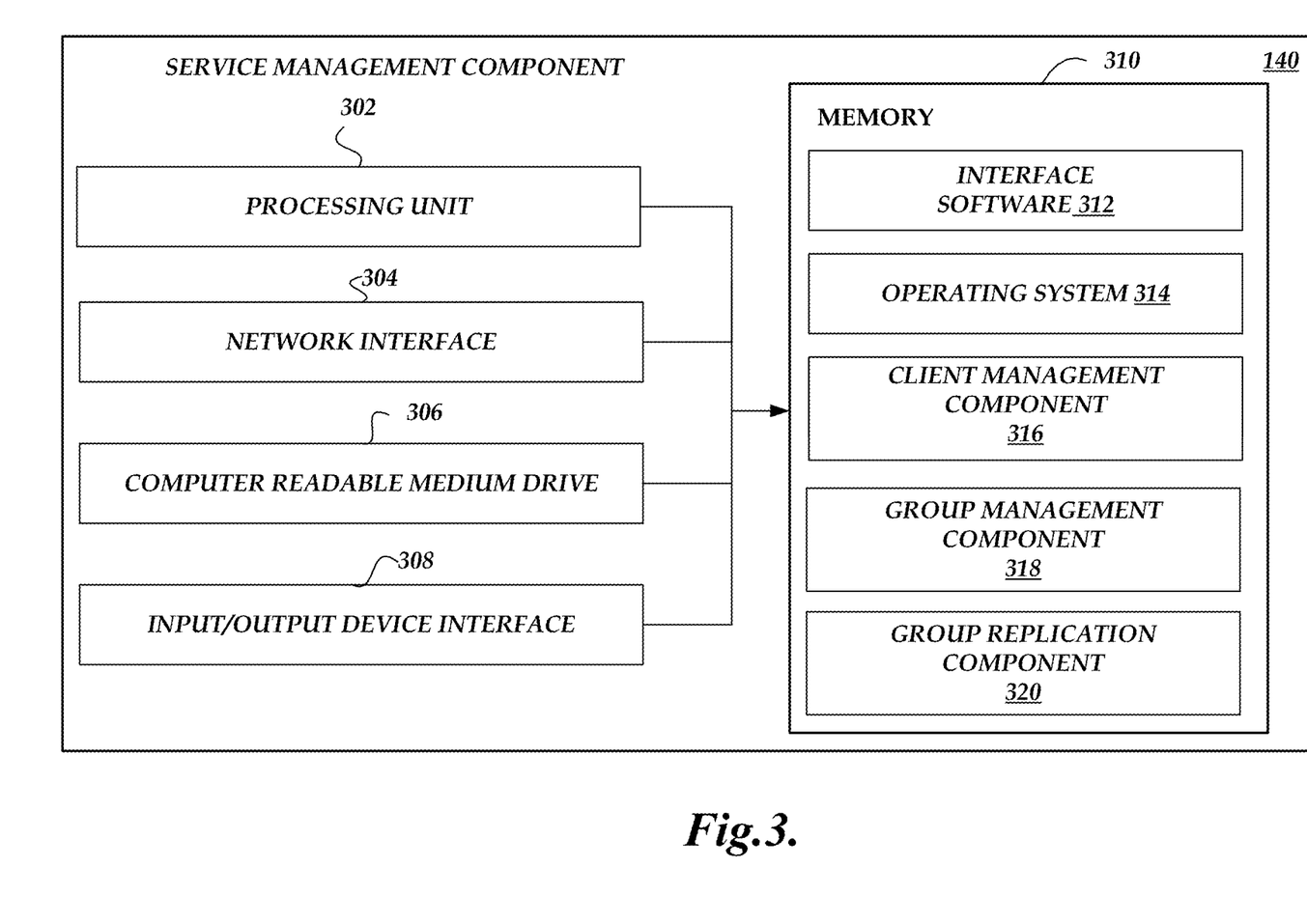
FIG. 3 depicts an example schematic diagram that implements a service management component in accordance with illustrative aspects of the present disclosure.

FIG. 3 depicts a general architecture of a computing device configured to perform the service management service 140, according to some embodiments. The general architecture of the service management service 140 depicted in FIG. 3 includes an arrangement of computer hardware and software that may be used to implement aspects of the present disclosure. The hardware may be implemented on physical electronic devices, as discussed in greater detail below. The service management service 140 may include many more (or fewer) elements than those shown in FIG. 3. It is not necessary, however, that all of these generally conventional elements be shown in order to provide an enabling disclosure. Additionally, the general architecture illustrated in FIG. 3 may be used to implement one or more of the other components illustrated in FIG. 1.

As illustrated, the service management service 140 includes a processing unit 302, a network interface 304, a computer readable medium drive 306, and an input/output device interface 308, all of which may communicate with one another by way of a communication bus. The network interface 304 may provide connectivity to one or more networks or computing systems. The processing unit 302 may thus receive information and instructions from other computing systems or services via the network. The processing unit 302 may also communicate to and from memory 310 and further provide output information for an optional display via the input/output device interface 308. The input/output device interface 308 may also accept input from an optional input device (not shown).

The memory 310 can contain computer program instructions (grouped as units in some embodiments) that the processing unit 302 executes in order to implement one or more aspects of the present disclosure. The memory 310 corresponds to one or more tiers of memory devices, including (but not limited to) RAM, 3D XPOINT memory, flash memory, magnetic storage, and the like.

The memory 310 may store an operating system 314 that provides computer program instructions for use by the processing unit 302 in the general administration and operation of the service management service 140. The memory 310 may further include computer program instructions and other information for implementing aspects of the present disclosure. For example, in one embodiment, the memory 310 includes an interface component 312 that receives client requests, directly or indirectly. The memory 310 may further include a client management component 316 configured to parse client requests to detect or identify client identifiers and to determine whether a service group 120 has been previously associated with the client identifier. The memory 310 may also include a service group management component 318 to manage the implementation instantiation of service groupings and association of service groups to client identifiers. Additionally, in some aspects, the service group management component 318 can further be configured to manage individual resources for service groups based on the requirements of individual service requests, existing loads or resource consumption at individual service groups, or combination thereof. The memory 310 can further include a group replication component 320 configured to facilitate the replication of service group associations over various regions 112. One skilled in the relevant art will appreciate that the components of FIG. 3 are illustrative in nature.

Figure 4A:
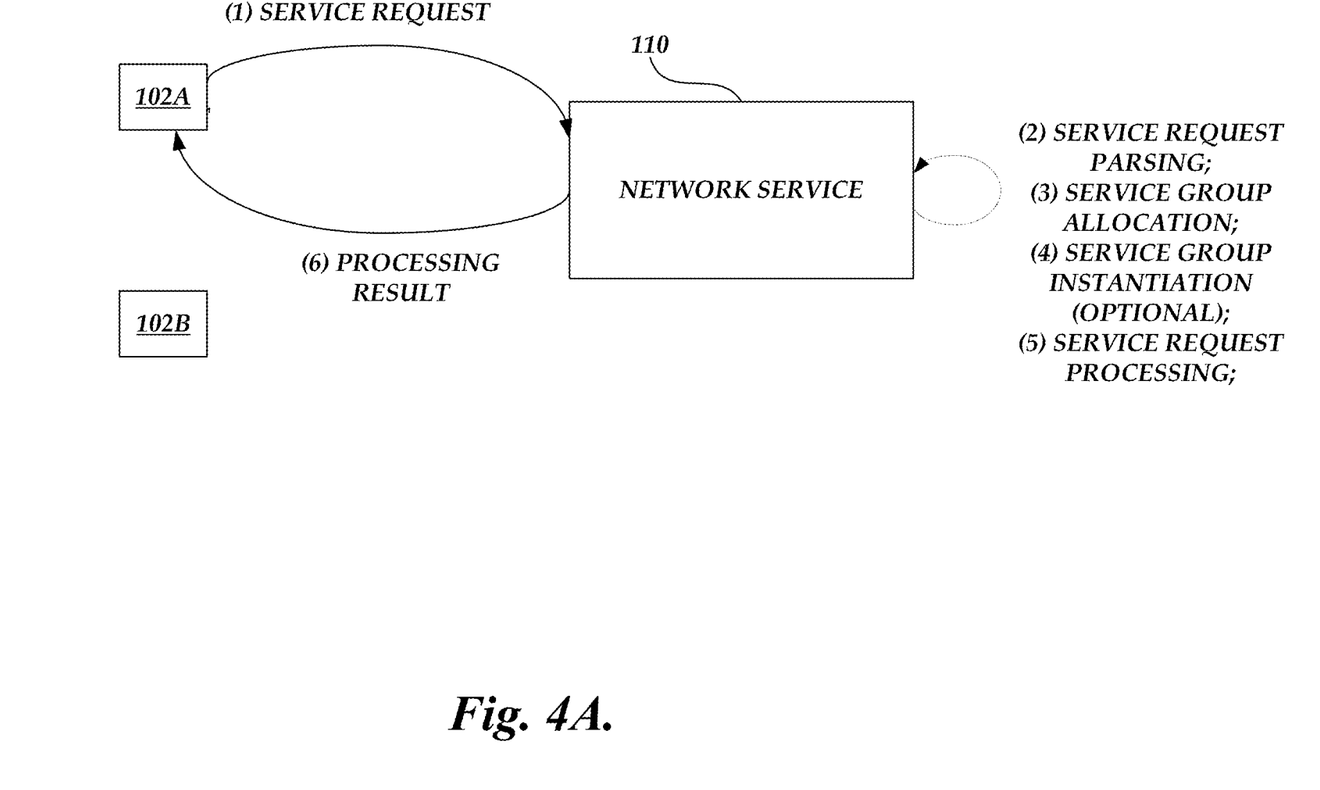
FIGS. 4A-4C are schematics of the environment FIG. 1 illustrating interactions in accordance with various aspects of the present application.
Figure 4B:
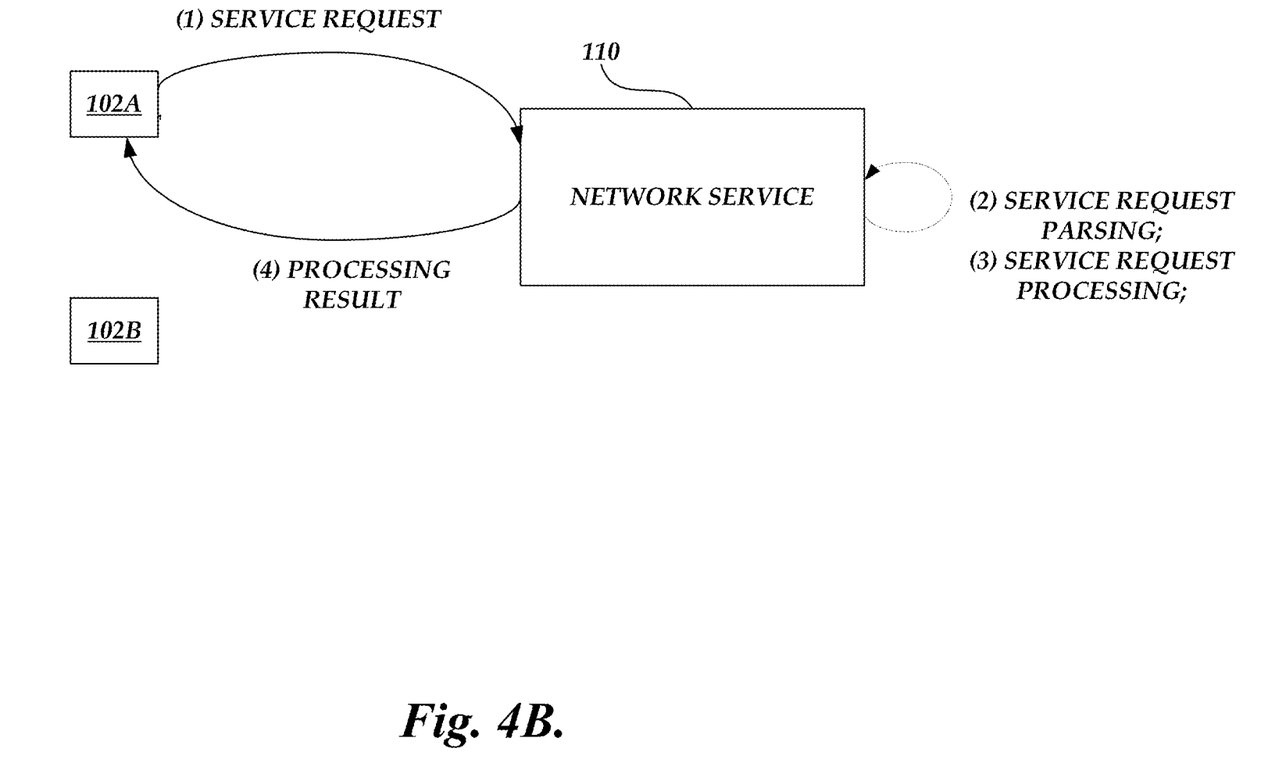
Figure 4C:
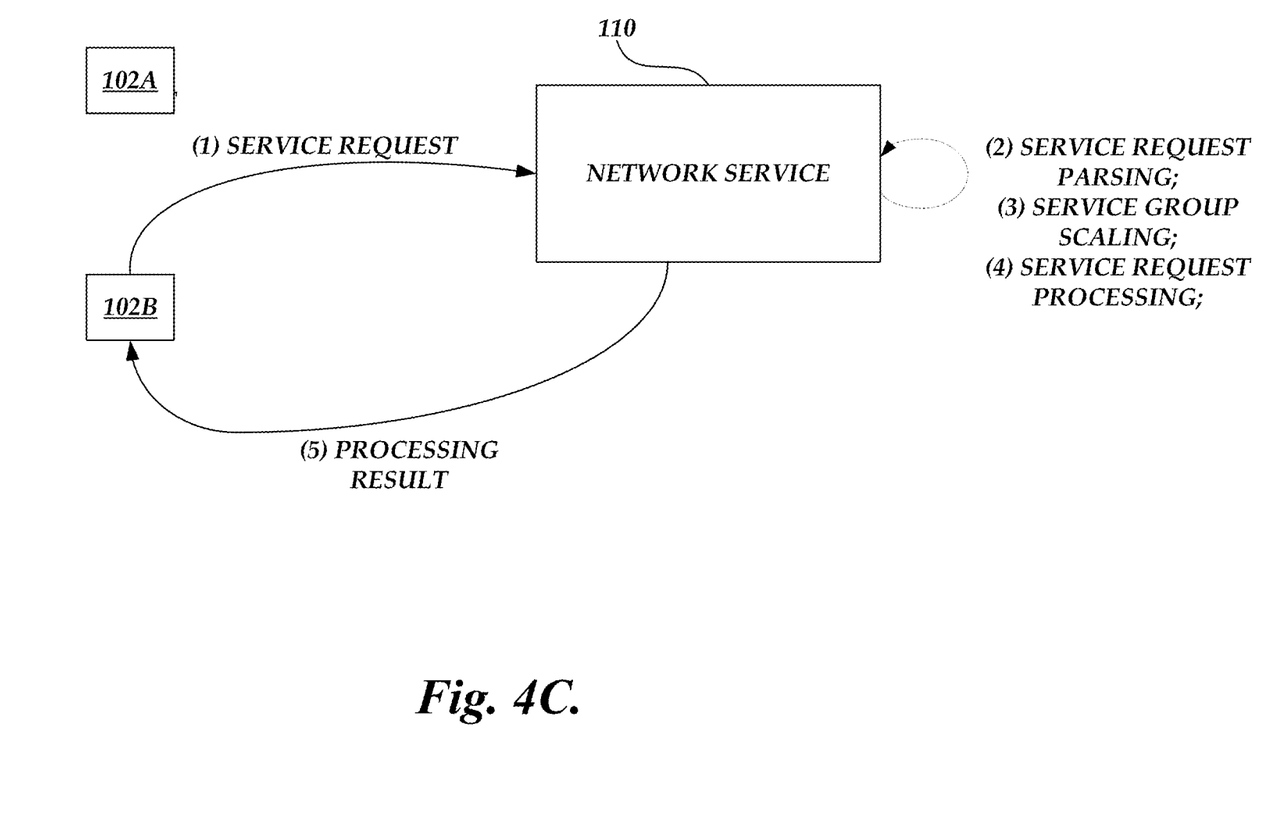

Turning now to FIGS. 4A-4C, illustrative embodiments depicting different interactions between the components of the network environment 100 will be described. For purposes of illustration, the interactions have been simplified in terms of the components depicted in FIGS. 4A-4C. Such simplifications should not be construed as limiting. With reference to FIG. 4, an illustrative embodiment depicting an initial service request from a client device 102A that corresponds to a client identifier, such as unique network identifier, that has not been previously associated with a service group 120 will be described. At (1), the client device 102A transmits a service request to the network service 110A. The service request can illustratively include a client identifier, such as customer identifier, that may be configured for additional or alternative purposes, such as authentication, authorization, etc. and may be part of an established communication protocol. The client identifier may also be provided as part of subsequent protocols/exchanges between the client 102A and the network service provider 110.

At (2), the network service provider 110 parses the request and determines that the client identifier has not been previously associated with a service group 120. Accordingly, at (3), the network service provider 110 allocates a service group 120. The allocation can be based on various criteria such as customer preferences or configurations, current network conditions, available service group resources, and resource requirements associated with the received service request. For example, the allocation may be based on attributes of the client specific data that will be part of the integrated service and data that forms the service group 120. At (4), in one embodiment, if a service group has not been previously instantiated, the network service provider 110 can cause the instantiation of computing resources (e.g., virtual machine instances in accordance with the specified allocation. Alternatively, the network service provider 110 may have pre-instantiated service groups that can be assigned responsive to the service request.

At (4), the network service provider 110 can process the service request at the assigned service group 120. Illustratively, a processing result can be generated in accordance with the specifics of the service request, such as additional information, notifications, results, etc. As described herein, the processing of the service request at the service group 120A correspond to the execution of one or more service integrated with client information. An initial processing of the service request can include obtaining the requested or specific client information or such information may be previously collected as part of the allocation of the service group to the client identifier. At (5), the network service provider 110 returns the processing result, which can include client identifiers or other information that can be utilized in subsequent service requests by the client 102A. As described previously, in one embodiment, the network service provider 110 may provide additional information that allows for direct communication or minimized routing of subsequent service requests to the assigned service group 120.

With reference now to FIG. 4B, assume that subsequent to the interaction illustrated in FIG. 4A, the client device 102A transmits a new service request to the network service provider 110 at (1). The network request can be illustratively received at the same region 112A or in a different region than a region receiving the initial request in FIG. 4A. Additionally, in some embodiments, the subsequent service request may be facilitated using direct, or more direct routing, such as via routing/communication information provided to the client device 102A after subsequent to the initial allocation. At (2), the network service provider 110 parses the request and determines that the client identifier has been previously associated with a service group 120. Accordingly, at (3), the network service provider 110 can process the service request at the assigned service group 120. Illustratively, a processing result can be generated in accordance with the specifics of the service request, such as additional information, notifications, results, etc. At (4), the network service provider 110 returns the processing result, which can include client identifiers or other information that can be utilized in subsequent service requests by the client 102A (if not previously provided).

With reference to FIG. 4C, an illustrative embodiment related to management of service group resources will be described. For purposes of illustration, this interaction will be related to a different client device 102B to further illustrate that the processing of service requests can be independently managed. It will be assumed that the client device 102B has already been allocated to a specific service group 120B. At (1), the client device 102B transmits a new service request to the network service provider 110. At (2), the network service provider 110 parses the request and determines that the client identifier has been previously associated with a service group 120.

Illustratively, prior to processing the service request, at (3), the network service provider 110 can determine that additional resources for the service group 120B may be required or requested in order to process the service request at the assigned service group 120B. The additional resources can illustratively correspond to the computing resources utilized in the integrated service and client data, and can correspond to computing resources for hosting/providing the service, computing resources for hosting/provided data or a combination thereof. The network service 110 can then independently manage the resources utilized to host the services in each respective service group based on the requirements of the service groups, current loads attributable to all client requests, or a combination thereof. For example, the network service 110 can scale individual resources within a service group 120 without having to scale similar resources in other service groups 102. Additionally, the scaling of resources can be related to a subset of the resources corresponding to the individual service group 120 so that all resources within a service group have to be scale equally. he network service provider 110 can utilize resource.

At (4), the network service provider 110 can process the service request at the assigned service group 120. Illustratively, a processing result can be generated in accordance with the specifics of the service request, such as additional information, notifications, results, etc. At (5), the network service provider 110 returns the processing result, which can include client identifiers or other information that can be utilized in subsequent service requests by the client 102B.

Figure 5:
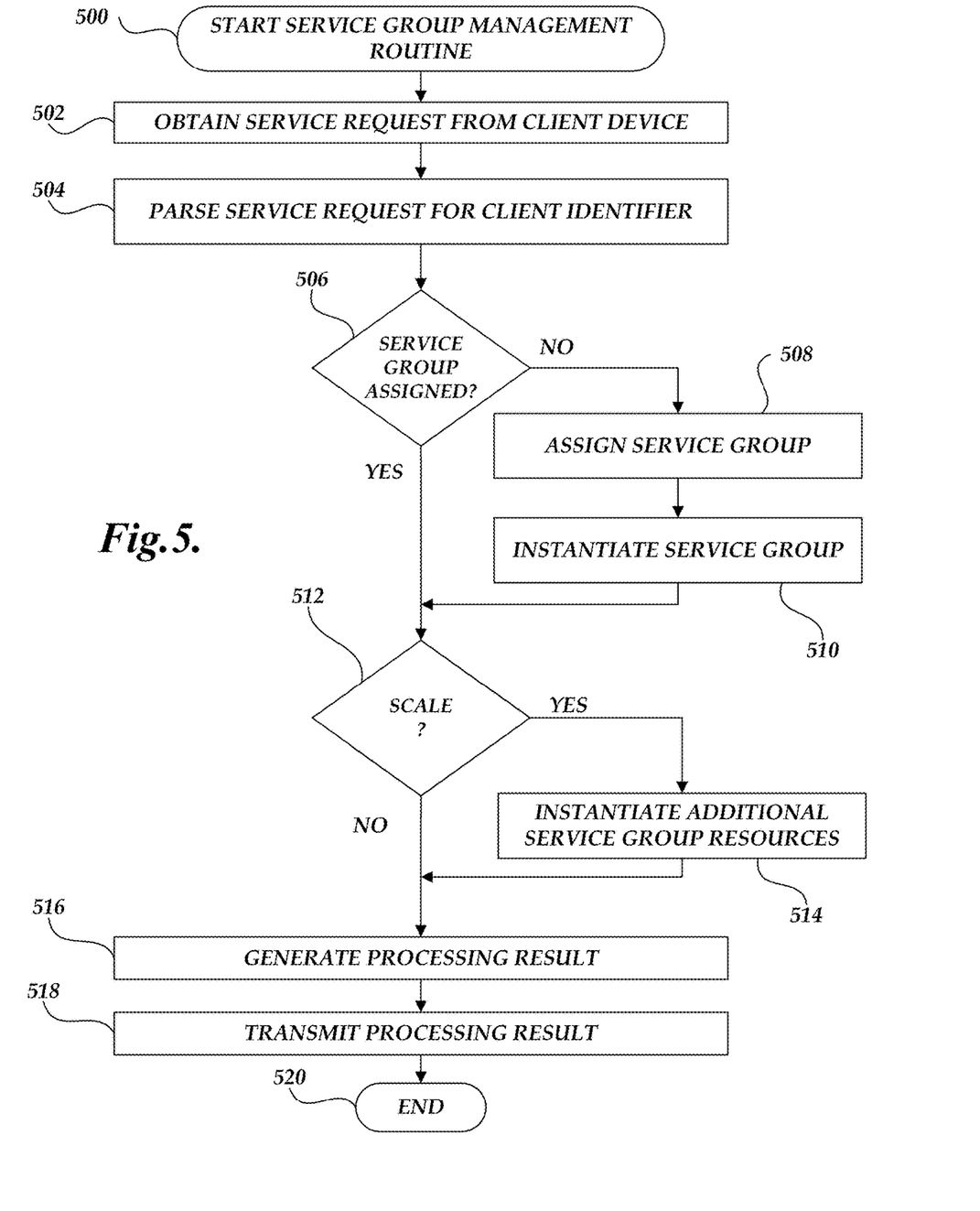
FIG. 5 is flow diagram illustrative of a service group management routine implemented by a network service in accordance with illustrative aspects of the present disclosure.

FIG. 5 is a flow diagram depicting an example routine 500 for managing service requests utilizing service groups. The routine 500 may be carried out by the service management component 140, for example. At block 502, the service management component 140 obtains the service request. Illustratively, a client device 102 transmits a service request to the network service 110A. The service request can illustratively include a client identifier, such as customer identifier, that may be configured for additional or alternative purposes, such as authentication, authorization, etc. and may be part of an established communication protocol. The client identifier may also be provided as part of subsequent protocols/exchanges between the client 102A and the network service provider 110.

At block 504, the network service provider 110 parses the request for the client identifier. At decision block 506, a test is conducted to determine whether the client identifier has been previously associated or assigned to a service group. If no association has been previously made, at block 508, the service management component 140 allocates or associates a service group 120. The allocation can be based on various criteria such as customer preferences or configurations, current network conditions, available service group resources, and resource requirements associated with the received service request. For example, the allocation may be based on attributes of the client specific data that will be part of the integrated service and data that forms the service group 120. At block 510, in one embodiment, if a service group has not been previously instantiated, the network service provider 110 can cause the instantiation of computing resources (e.g., virtual machine instances in accordance with the specified allocation. Alternatively, the network service provider 110 may have pre-instantiated service groups that can be assigned responsive to the service request at block 510 may be omitted. Illustratively, the network service provider 110 can include any selection of service to include a processing group, such as database applications, that are integrated with customer specific information.

If a service group has been previous allocated at decision block 506 or once a service group is allocated (blocks 508-510), at decision block 512, a test is conducted to determine whether additional resources for the service group 120B may be required or requested in order to process the service request at the assigned service group 120B. If so, at block 514, the network service 110 can then independently manage the resources utilized to host the services in each respective service group based on the requirements of the service groups, current loads attributable to all client requests, or a combination thereof. For example, the network service 110 can scale individual resources within a service group 120 without having to scale similar resources in other service groups 102. Additionally, the scaling of resources can be related to a subset of the resources corresponding to the individual service group 120 so that all resources within a service group have to be scale equally. he network service provider 110 can utilize resource.

Once additional network resources have been scaled or if not scaling is request, at block 516, the network service provider 110 can process the service request at the assigned service group 120. Illustratively, a processing result can be generated in accordance with the specifics of the service request, such as additional information, notifications, results, etc. As described herein, the processing of the service request at the service group 120A correspond to the execution of one or more service integrated with client information. An initial processing of the service request can include obtaining the requested or specific client information or such information may be previously collected as part of the allocation of the service group to the client identifier. At block 518, the network service provider 110 returns the processing result, which can include client identifiers or other information that can be utilized in subsequent service requests. At block 520, routine 500 terminates.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a similarity detection system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A similarity detection system can be or include a microprocessor, but in the alternative, the similarity detection system can be or include a controller, microcontroller, or state machine, combinations of the same, or the like configured to estimate and communicate prediction information. A similarity detection system can include electrical circuitry configured to process computer-executable instructions. Although described herein primarily with respect to digital technology, a similarity detection system may also include primarily analog components. For example, some or all of the prediction algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a similarity detection system, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the similarity detection system such that the similarity detection system can read information from, and write information to, the storage medium. In the alternative, the storage medium can be integral to the similarity detection system. The similarity detection system and the storage medium can reside in an ASIC. The ASIC can reside in a user terminal. In the alternative, the similarity detection system and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for managing service requests, the system comprising:

a plurality of client devices, wherein individual clients correspond to customer of a network service, the plurality of client devices configured to transmit requests to access network services hosted by the network service; and one or more computing devices associated with a service management system, wherein the service management system is configured to:

obtain a first network service request from a first client device of the plurality of client devices;

parse the first network service request to obtain a first unique identifier corresponding to the first client device;

cause a processing of the first network service request by a first service group corresponding to a first set of integrated hosted network services and data specific to the first unique identifier, wherein the first set of integrated hosted network services and data correspond to a first instantiation of network services unique to the first unique identifier, wherein individual instantiations of the network services are associated with one unique identifier, and wherein the first instantiation of network services and data corresponds to an allocation by the service management system of computing resources necessary for execution of network services by the service management system integrated with data specific to the first unique identifier, which are subsequently accessible only for requests associated with the first unique identifier;

obtain a second network service request from a second client device of the plurality of client devices;

parse the second network service request to obtain a second unique identifier corresponding to the second client device; and cause a processing of the second network service request by a second service group corresponding to a second set of integrated hosted network services and data specific to the second unique identifier, wherein the second set of integrated hosted network services correspond to a second instantiation of network services unique to the second unique identifier and data unique to the second unique identifier wherein the second instantiation of network services and data corresponds to an allocation by the service management system of computing resources necessary for execution of network services integrated with data specific to the second unique identifier, which are subsequently accessible only for requests associated with the second unique identifier,
wherein the first service group and the second service group are isolated and wherein isolation comprises at least isolation between the first set of integrated hosted network services and data and the second set of integrated hosted network services and data, and
wherein the first service group and second service group are configured to provide a common defined set of hosted network services.

2. The system of claim 1, wherein the service management system is further operable to assign the first service group or second service group in response to a respective initial request by the first client device or second client device.

3. The system of claim 1, wherein the service management system is further operable to independently scale at least one resource utilized for hosting at least a subset of the first set of integrated hosted network services and data in response to the first network service request.

4. The system of claim 1, wherein the first unique identifier and second unique identifier correspond to a multi-regional service and wherein the first set of integrated hosted network services and data and the second set of integrated hosted network services and data are common to each region in the multi-regional service.

5. The system of claim 1, wherein the first unique identifier and second unique identifier correspond to a multi-regional service and wherein at least one hosted network service and integrated data are common to each region in the multi-regional service.

6. A method for managing service requests from a plurality of client devices, the method comprising:
obtaining a network service request from a client device of the plurality of client devices, wherein individual client devices of the plurality of client devices correspond to customer of a network service, the individual client devices configured to transmit requests to access network services hosted by the network service;
parsing the network service request to obtain a unique identifier corresponding to individual computing devices; and
causing a processing of the parsed network service request by a unique service group of a plurality of service groups, the unique service group corresponding to an instantiation of integrated services associated with a unique identifier and client specific data associated with the unique identifier, wherein individual instantiations of the network services are associated with one unique identifier;
wherein the instantiation of network services corresponds to an allocation of computing resources specific to the unique identifier and necessary for execution of integrated services and client specific data which are subsequently accessible only for requests associated with the unique identifier,
wherein the computing resources associated with the unique service group is accessible only for requests associated with the unique identifier and wherein the computing resources specific to the unique identifier are isolated from computing resources associated with other service groups in the plurality of service groups, and
wherein isolation comprises at least isolation between the computing resources specific to the unique identifier and the computing resources associated with other service groups in the plurality of service groups.

7. The method of claim 6, further comprising:
determining from the network service request that a unique service group has not been previously associated with the unique identifier; and
assigning a unique service group to the unique identifier.

8. The method of claim 7, further comprising instantiating a service group responsive to determining from the network service request that a unique service group has not been previously associated with the unique identifier.

9. The method of claim 7, further comprising associating an instantiated service group responsive to determining from the network service request that a unique service group has not been previously associated with the unique identifier.

10. The method of claim 7, further comprising causing a replication of the assigned unique service group to the unique identifier to at least one additional region, wherein the at least one additional region hosts common integrated services and client specific data associated with the assigned unique service group.

11. The method of claim 6, further comprising evaluating available associated service group resources based on a set of resources utilized in hosting the service and integrated service.

12. The method of claim 11, further comprising, scaling a subset of the set of resources based on at least one requirement of the obtained network service request.

13. The method of claim 11, further comprising scaling a subset of the set of resources based on at least one or more additional client requests processed by the unique service group.

14. A method for managing service requests from a plurality of client devices, the method comprising:
responsive to client service requests from the plurality of client devices, wherein each client service request is associated with a unique identifier corresponding to an individual client device, identifying individual service groups to process the service requests, wherein each individual service group corresponds to a unique individual instantiation of a set of integrated network services associated with a unique identifier and client specific data associated with the unique identifier, and wherein individual instantiations of the network services are associated with one unique identifier,
wherein each unique individual instantiation corresponds to an allocation of computing resources necessary for execution of the integrated network services and client specific data, which are subsequently accessible only for requests associated with the unique identifier, and
causing a processing of the client service requests by the identified individual service groups, wherein each individual service group of the identified individual service groups is isolated from a plurality of service groups, and wherein isolation comprises at least isolation between the set of integrated network services and data specific to the identified individual service group and each set of integrated network services and data for each of the plurality of service groups.

15. The method of claim 14, further comprising:
determining from a network service request that a unique service group has not been previously associated with the unique identifier; and
assigning a unique service group to the unique identifier.

16. The method of claim 15, further comprising instantiating a service group responsive to determining from the network service request that a unique service group has not been previously associated with the unique identifier.

17. The method of claim 15, further comprising associating an instantiated service group responsive to determining from the network service request that a unique service group has not been previously associated with the unique identifier.

18. The method of claim 15, further comprising causing a replication of the assigned unique service group to the unique identifier to at least one additional region, wherein the at least one additional region hosts common integrated services and client specific data associated with the assigned unique service group.

19. The method of claim 14, further comprising evaluating available associated service group resources based on a set of resources utilized in hosting the integrated service and client specific data.

20. The method of claim 19, further comprising scaling a subset of service group resources based on at least one requirement of network service requests.

21. The method of claim 19, further comprising scaling a subset of service group resources based on at least one or more additional client requests processed by the unique service group.

* * * * *